Oct. 2, 1956

E. N. SHAWHAN 2,765,219

APPARATUS FOR MEASURING AND CONTROLLING
ALKALINITY OF NON-AQUEOUS LIQUIDS

Filed April 8, 1952

INVENTOR.
ELBERT NEIL SHAWHAN
BY
Busser, Smith & Harding
ATTORNEYS

Oct. 2, 1956 E. N. SHAWHAN 2,765,219
APPARATUS FOR MEASURING AND CONTROLLING
ALKALINITY OF NON-AQUEOUS LIQUIDS
Filed April 8, 1952 4 Sheets-Sheet 2

INVENTOR.
ELBERT NEIL SHAWHAN
BY
ATTORNEYS

FIG. 5A.

INVENTOR.
ELBERT NEIL SHAWHAN

Oct. 2, 1956 E. N. SHAWHAN 2,765,219
APPARATUS FOR MEASURING AND CONTROLLING
ALKALINITY OF NON-AQUEOUS LIQUIDS
Filed April 8, 1952 4 Sheets-Sheet 4

FIG. 5B.

*INVENTOR.*
ELBERT NEIL SHAWHAN
BY

ATTORNEYS

United States Patent Office 2,765,219
Patented Oct. 2, 1956

2,765,219

APPARATUS FOR MEASURING AND CONTROLLING ALKALINITY OF NON-AQUEOUS LIQUIDS

Elbert Neil Shawhan, Newtown Square, Pa., assignor to Sun Oil Company, Philadelphia, Pa., a corporation of New Jersey Application April 8, 1952, Serial No. 281,248

18 Claims. (Cl. 23—253)

This invention relates to a method and apparatus for measuring and controlling the alkalinity of non-aqueous liquids, and has particular reference to a method and apparatus adapted to highly viscous oily or tarry liquids which are fluent only at elevated temperatures. As will appear hereafter certain aspects of the invention are of broader applicability.

The present invention is particularly applicable to the conversion of naphthenic soaps into naphthenic acids by the addition of acid to heavy oils previously treated with caustic. Oils of the type which will be particularly referred to herein are fluent only at temperatures of the order of 300° F. and upwards. In particular, the problem which will be specifically described is that of securing alkalinity within a limited range which may be best defined by the per cent volume of concentrated sulfuric acid which is required to complete the neutralization. In these terms the alkalinity, for example, is to be controlled between limits of about 0.05% to 0.15%. After original caustic treatment the oil may be more alkaline than 0.15% and the alkalinity is reduced by the addition of sulfuric acid in regulated amounts. The treatment is generally carried out by adding sulfuric acid by means of an adjustable proportioning pump which regulates the amount of acid injected on each stroke. The acid and oil are mixed by passage through a series of orifices or by intimate admixture in a mixing chamber. The reaction is a relatively slow one and intimate admixture and a substantial period of time are required for the acidifying action.

In view of the high temperatures which are involved and the non-aqueous nature of the material undergoing treatment, the usual means applicable at low temperatures to aqueous liquids are not adaptable for measurement of the degree of neutralization. It has accordingly been customary in the past to draw off samples at intervals and check these for alkalinity by a chemical titration process after the addition of suitable solvents. However, by the time the correction is ascertained there will be passed through the apparatus a considerable quantity of improperly acidified oil and consequently this must be diverted to storage tanks for retreatment. In extreme cases damage to the plant may result from formation of either coke or salt crystals and corrosion by excess acids.

In my application Ser. No. 192,400, filed October 27, 1950, there are described a method and apparatus involving the electrical determination of a component of the impedance of the liquid undergoing treatment. It has been found that if the liquid is passed through an impedance cell in such fashion as to provide a dielectric between conductors, i. e., a cell consisting of an outer metallic cylinder having an interior electrode extending axially therethrough, the reactance may be measured since it, in particular, is found to undergo a rather sudden change as the alkalinity reaches and passes through the required limits on the alkaline side of normal.

While the method and apparatus described in said prior application is of considerable value in showing whether or not the acidity of the treated oil was correct, the usefulness of the apparatus would obviously be increased greatly if it would automatically adjust the rate of acid injection for optimum alkalinity. It is sometimes quite difficult to make this adjustment manually by watching the indicator. In particular experience has shown that the alkalinity of the stream can vary rapidly and fluctuate widely particularly when a charge stock is being blended with a re-run stock. In order to maintain the alkalinity within the narrow limits necessary for best yield the acid delivery rate must be checked frequently. The control problem is made difficult by the long time that elapses between a change in acid delivery rate and the corresponding change in alkalinity of the oil emerging from the foam tower. This long time interval would make the system subject to oscillation under continuous type of control. As a further complication there may sometimes be appreciable changes in the charging stock during the time interval between changing the acid injection rate and measuring the resulting alkalinity change of the material coming out of the foam tower.

The general object of the present invention is to provide a control system for a process of the type just indicated. A memory system is involved and this is applicable to the control of other processes which involve similar problems. As will appear hereafter the apparatus of the present invention involves a memory system which compares values of a variable for successive intervals and exerts a controlling action depending upon the nature of the compared result. In brief the invention applies a memory system to a control process where the process lag is very great. It also seeks a maximum or minimum of a variable by comparing successive changes following successive increments of a controlled variable.

Also in accordance with the invention there is provision made for rendering the controller temporarily inactive when the process is in a satisfactory phase of operation, this feature serving to avoid hunting.

The foregoing objects and others relating to details of construction and operation will become apparent from the following description read in conjunction with the accompanying drawings in which.

Figure 4:
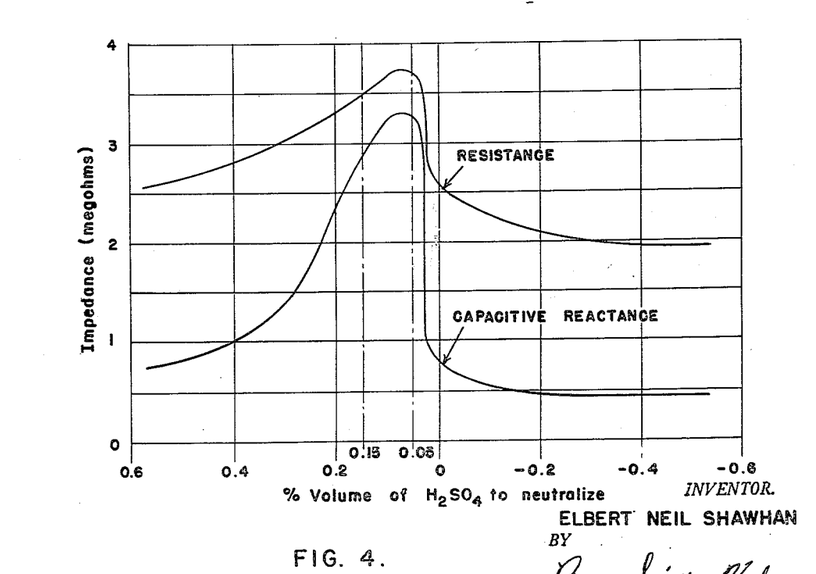
Figure 4 is a graph illustrating the changes of reactance and resistance which occur in the oil referred to in the region of desired alkalinity.

Reference may be made first to Figure 4 which plots reactance (reactive impedance) and resistance for oil of the type referred to above against the percent volume of concentrated sulfuric acid required for neutralization. The zero of the abscissae indicates the neutral point. The limits of 0.15% and 0.05% on the alkaline side of neutral are indicated by chain lines. As will be evident from the graph, the resistive component of the impedance arises from a condition of extreme alkalinity reaching a peak value in the region of 0.07%. It then drops sharply and approaches a constant value on the acid side of neutral. A similar curve represents the variations of the reactive component, or reactance, of the impedance. It will be noted that the magnitude of change of the reactive component, percentagewise, is considerably in excess of the change of the resistive component. While the change of the resistive component may be used as an indication of proper alkalinity, it is preferred to use the more critical change of the reactive component and the apparatus hereafter described in detail provides measurements and control based on the changes of the reactive component. It will be evident that the total impedance may also be used as an indication since this will vary in general similarity to the two components.

It may here be noted that the reactive component in the region of interest is capacitive; far beyond this in the regions of excessive alkalinity and of excessive acidity the reactive component passes through a zero value, becoming inductive. The latter condition particularly indicates that, despite its form, the impedance cell does not act merely as a condenser.

Figure 1:
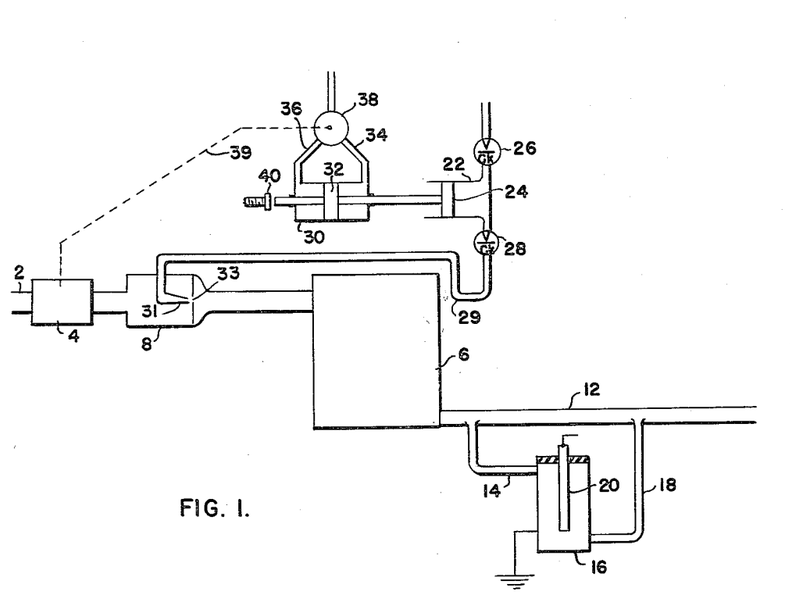
Figure 1 is a diagram illustrating a form of apparatus which may be provided in accordance with the invention.

Reference may now be made to Figure 1 which shows diagrammatically an apparatus for the treatment and measurement. While not illustrated in the diagram it will be understood that the entire apparatus, when heavy oils are being treated, will be steam jacketed in order to provide a temperature at which the oils are sufficiently fluent to be pumped and undergo admixture with sulphuric acid for the proper partial neutralization of the alkalinity.

The oil to be treated enters the apparatus through pipe 2 and passes through a flow meter indicated at 4 and thence through a mixing chamber 8 to a vessel 6 which is generally referred to as a foam tower. The treated oil is delivered through a pipe 12, there being provided in a suitable portion of the system a pump which is not shown. The pipe 12 is provided with a bypass comprising the cell 16 and its inlet and outlet connections 14 and 18. This cell may comprise a cylindrical metallic casing through the top of which there is mounted, by means of an insulator, a central axially located electrode 20. The cell in the bypass continuously samples the major portion of the material passing through pipe 12.

Concentrated sulfuric acid is supplied by a pump which comprises the piston 24 mounted in a cylinder 22 which is provided with inlet and outlet valves 26 and 28 respectively, the acid being delivered through the latter to the pipe connection 29 which ends in a nozzle 31 in the mixing chamber 8. The mixture of acid and oil is thoroughly mixed by passage through a mixing orifice 33 and then flows to the foam tower.

The piston 24 has strokes imparted to it by an air cylinder arrangement comprising the piston 32 in its cylinder 30 to which connections are provided through pipes 34 and 36 from an air distributing valve 38 receiving air from a compressed source. The valve 38 which may be of a conventional rotary ported type is driven by shafting 39 from the flow meter 4 so that the piston 32 and the piston 24 are given strokes which are proportional in number to the oil passing through the flow meter 4 to the foam tower. The ratio of the amount of acid delivered to the volume of oil is adjustable, however, by change of length of the pump strokes which is effected by adjustment of a stop screw 40 which limits the travel of the rod of pistons 32 and 24 in one direction. Due to the pneumatic drive a stop such as 40 suffices for this purpose.

Figure 2:
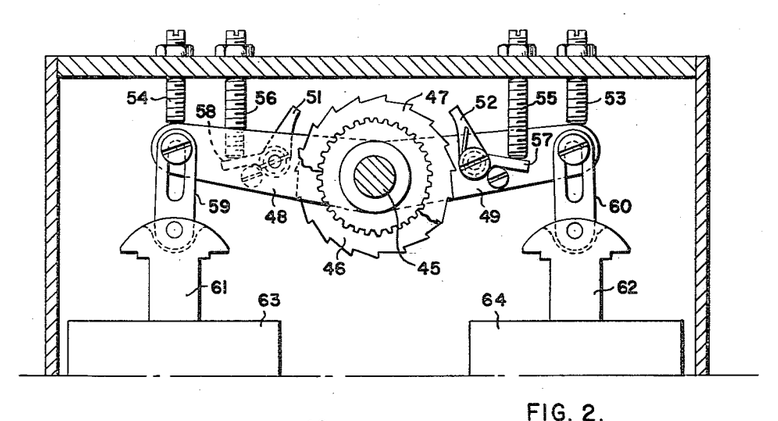
Figure 2 is a vertical section showing in particular the mechanical arrangements for varying the operation of a pump.
Figure 3:
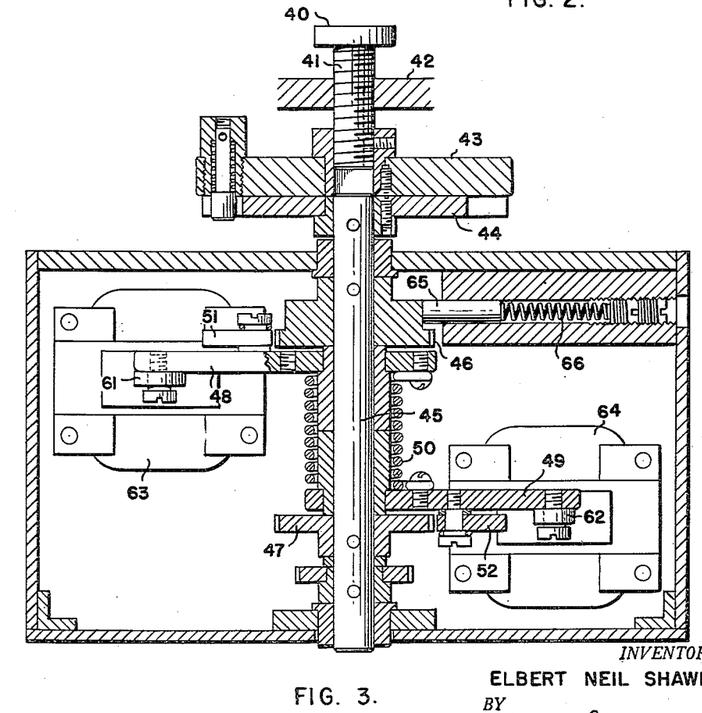
Figure 3 is a horizontal section of the devices shown in Figure 2.

The adjustment of the stop screw 40 is effected by the mechanical arrangements illustrated in Figures 2 and 3. The stop screw 40 has a threaded shank 41 which passes through a fixed nut 42 and is rotated by a splined connection with a coupling member 43 which is releasably engaged with a cooperating coupling member 44 carried by a shaft 45. To this shaft there are secured ratchets 46 and 47 having their teeth facing in opposite directions. Journalled on the shaft 45 are arms 48 and 49 which are connected to opposite ends of a strong spring 50 which urges them in opposite rotary directions upwardly as viewed in Figure 2. Pawls 51 and 52 are respectively mounted on these arms for cooperation with the ratchets 46 and 47, the pawls being urged toward engagement with the ratchets by suitable springs. Adjustable stop screws 53 and 54 limit the upward movements of the arms 48 and 49, and adjustable stop screws 55 and 56 are arranged to be engaged by tail portions 57 and 58 of pawls 52 and 51 to disengage these pawls from their respective ratchets when their arms are in their upper stopped positions. Links 59 and 60 are provided with slots embracing pins at the ends of arms 48 and 49 and are connected at their lower ends respectively with the plungers 61 and 62 of solenoids 63 and 64. A brake plunger 65 is urged against the cylindrical hub of ratchet 46 by a spring 66 to prevent overrun of shaft 45.

As will hereafter appear the shaft 45 is arranged to be given steps in opposite directions by selective energization of the solenoids 63 and 64 to advance and retract the stop screw 40, thus to change the pump strokes. The stop screw 40 cannot be moved when the piston rod is in engagement with it under air pressure but at such time it is possible that one or the other of the solenoids may be energized. The mechanical arrangement just described is such that the energization of a solenoid when the stop screw is held against movement will nevertheless be effective to move the screw in the appropriate direction as soon as the screw is released. This end is achieved by virtue of the fact that if one of the solenoid plungers is pulled downwardly its corresponding pawl will move downwardly over a tooth of its ratchet and then when the solenoid current is cut off it will be held by the ratchet until the stop screw is released whereupon by the action of spring 50 an advancing movement is imparted to the shaft to change the stop screw position. Under static conditions both pawls are released from their ratchets, the conditions of the various mechanical parts being as illustrated in Figures 2 and 3.

While not shown in the figures, the shaft 45 may be interconnected to a helical type potentiometer which will give an electrical indication on an appropriate meter of the position of the stop screw and hence of the proportioning of acid to the oil being treated.

Reference may now be made to the electrical elements of the apparatus which, as will appear, control the energization of solenoids 63 and 64 to change the acid injection rate.

Figure 5A:
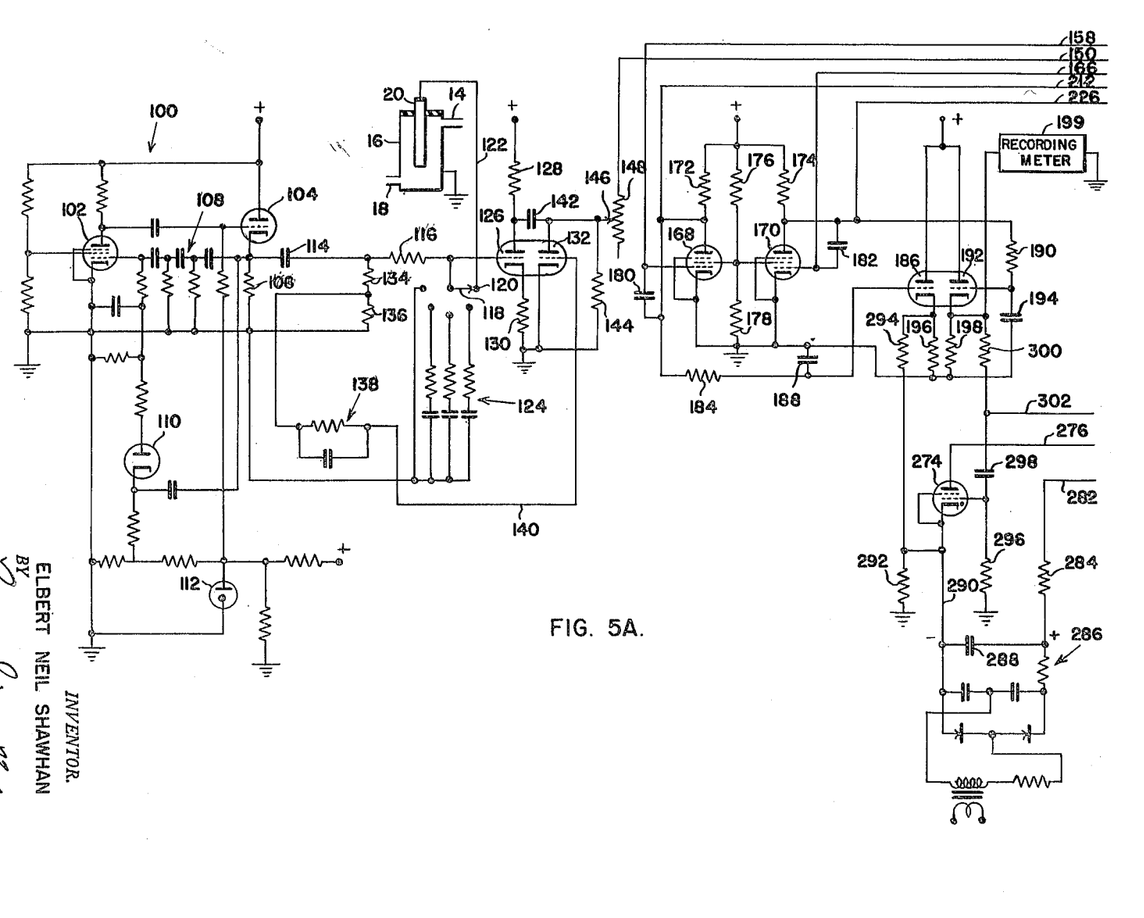
Figures 5A and 5B taken together constitute a wiring diagram of the electrical elements of the apparatus.

A phase shift oscillator 100 comprises a pentode 102 and an output cathode follower 104 providing feedback through a resistance-capacity network 108, the arrangement being conventional. A diode 110 regulates the oscillator amplitude. The rectified oscillator output is compared with the regulated voltage across a voltage reference tube 112 and the excess is returned as a bias on the control grid of the pentode. The arrangement is such as to provide output oscillations at substantially constant amplitude and independent of external load changes. The frequency delivered by the oscillator may vary within wide limits but a frequency of about 650 cycles per second has been found to give excellent results.

The output taken across the cathode load resistor 106 is delivered through condenser 114 and resistance 116 to the electrode 20 of the cell 16, the casing of which is grounded. A switch 118 is arranged in this circuit, making contact either with point 120 during normal operation or selectively with various resistance-capacitance combinations indicated at 124 or with ground for calibrating and testing purposes.

The electrode 20 of cell 16 is connected to the grid of a triode 126 provided with an anode load resistor 128 and a cathode resistor 130. Associated with triode 126 is a second triode 132 the grid of which receives signals from the potential dividing arrangement of resistances 134 and 136 connected between the output side of condenser 114 and ground, the connections to the grid being through the phase shifting network 138 and line 140. A condenser 142 connects the anodes of triodes 126 and 132 and the anode of triode 132 is connected to ground through a high resistance 144. The arrangement thus provided constitutes a synchronous rectifier providing an output at the contact 146 of variable resistance 148 which output is variable with the reactance appearing at the cell.

The action of this synchronous rectifying arrangement may be briefly and generally indicated as follows:

Resistance 116 is large in comparison with the impedance of the cell and therefore the potential appearing at the grid of triode 126 is small. Triode 126 serves as an amplifier and provides at the anode of triode 132 an amplified potential 180° out of phase with the potential of the grid of triode 126. The grid of triode 132 receives a signal substantially in phase with the signal applied to resistance 116 so that the potentials of the grid and anode of triode 132 are approximately 180° out of phase, both potentials varying about ground potential. If they were exactly 180° out of phase, as would be the case if the cell impedance had no reactive component, triode 132 would never be conducting and only an alternating signal would appear across resistance 144.

A reactive component of impedance at the cell shifts the phase of the potentials of the grid of triode 126 and of the anode of triode 132 so that the potential of the latter is no longer 180° out of phase with its grid. The triode 132 is then conducting during part of the cycle and a direct component appears across resistance 144 which is negative with respect to ground.

The R-C network 138 develops a bias on the grid of triode 132 due to flow of grid current when the grid is positive, and this bias controls the conducting part of the cycle. The R-C network is chosen for maximum change in the direct component of potential appearing at contact 146 for a change in cell impedance.

Resistance 148 is connected through line 150 to a switch arm 152 which cooperates with a contact 154 connected through a resistance 156 to a line 158. The line 150 is also connected to a switch arm 160 cooperating with a contact 162 which is connected through resistance 164 to a line 166. A pair of Miller integrators are provided comprising the pentodes 168 and 170 in conventional connections, there being provided the respective load resistances 172 and 174 joining their anodes with a positive potential supply. The screens of the pentodes are connected to a potential fixed by the junction of voltage dropping resistances 176 and 178. A condenser 180 connects the anode and control grid of pentode 168, and a condenser 182 of the same value connects the anode and control grid of pentode 170. The anode of pentode 168 is connected to ground through resistance 184 and condenser 188. The anode of pentode 170 is similarly connected to ground through resistance 190 and condenser 194. The junction between resistance 184 and condenser 188 is connected to the grid of triode 186 and the junction between resistance 190 and condenser 194 is similarly connected to the grid of triode 192. The triodes 186 and 192 are in cathode follower arrangements with cathode resistances 196 and 198.

The line 158 is connected to the control grid of pentode 168 and the line 166 is connected to the control grid of pentode 170.

Figure 5B:
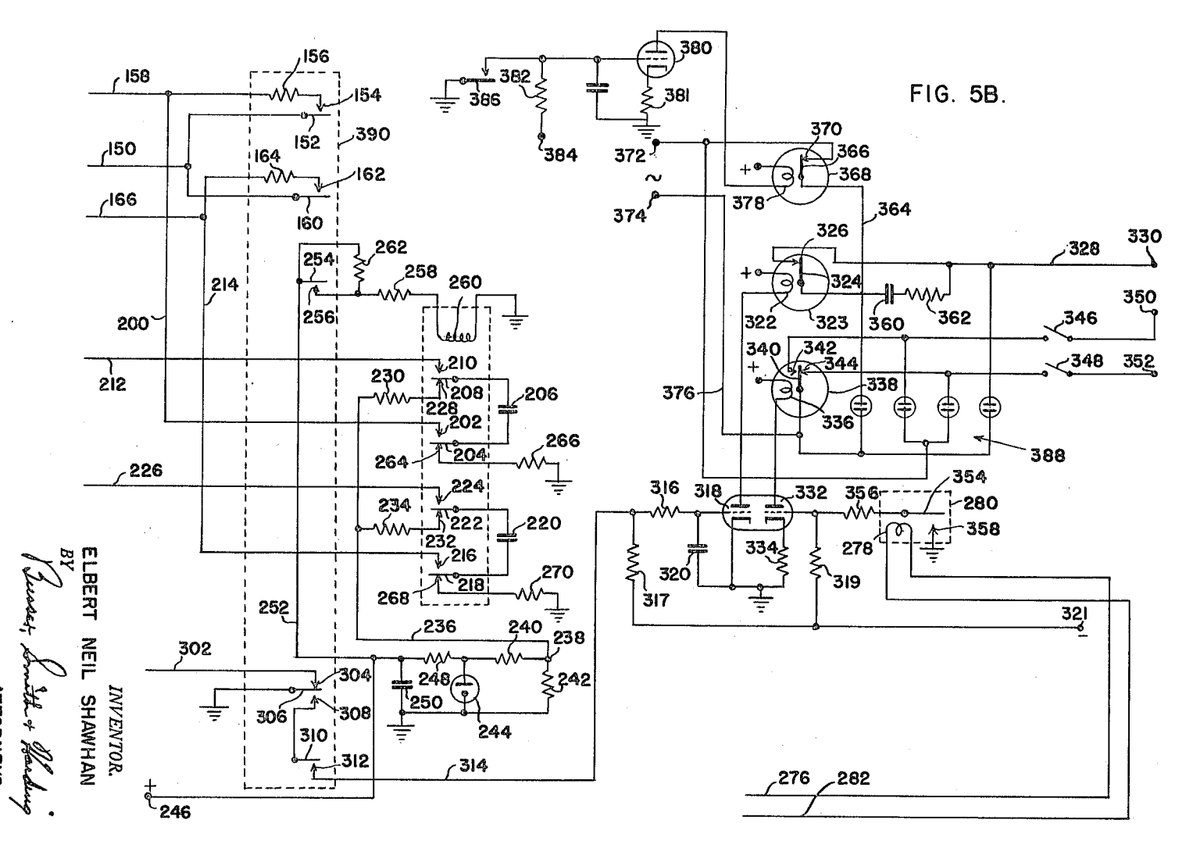

Line 158 is also connected through line 200 to the contact 202 with which cooperates an armature 204 of a relay, the armature 204 being connected to one terminal of a condenser 206 the other terminal of which is connected to an armature 208 cooperating with a contact 210 which is connected through line 212 to the anode of pentode 168. Line 166 is connected through line 214 to the contact 216 with which there cooperates the armature 218 connected to one terminal of a condenser 220 the other terminal of which is connected to armature 222 which cooperates with a contact 224 connected through line 226 to the anode of pentode 170. The various armatures 208, 204, 222 and 218 are in the same relay which has the energizing coil 260. As will be evident from the connections just described, when these armatures are in their upper positions, the condensers 206 and 220 are connected in parallel with the condensers 180 and 182 between the anodes and control grids of the respective pentodes.

A second contact 228 of armature 208 is connected through resistance 230 to a line 236 to which there is also connected a second contact 232 of armature 222 through resistance 234. The line 236 is connected to the junction of resistances 240 and 242 connected across a voltage reference tube 244 the cathode of which is grounded while its anode is connected through resistance 248 to the positive potential supply terminal 246, which is connected to ground through a condenser 250. The arrangement is such as to provide to line 236 a constant regulated positive potential.

The terminal 246 is also connected through line 252 to a switch arm 254 which cooperates with a contact 256 joined through resistance 258 to one end of the relay coil 260, the other end of which is grounded. The arm 254 and its contact 256 are shunted by a resistance 262 of high resistance value, the object of this resistance being to prevent sparking when the switch arm 254 disengages contact 256.

A second contact 264 cooperating with armature 204 is connected to ground through resistance 266 and a second contact 268 cooperating with armature 218 is similarly connected to ground through resistance 270.

A thyratron 274 has its anode conected through line 276, coil 278 of a stepping relay 280, and line 282 and resistance 284 to the positive terminal of a power supply 286 which takes the form of a voltage doubler charging a condenser 288. The negative terminal of the power supply is connected at 290 to the cathode of the thyratron which is connected through high resistance 292 to ground and through a resistance 294 to the cathode of triode 186. The control grid of the thyratron is connected through high resistance 296 to ground and through condenser 298 and resistance 300 to the cathode of triode 192. A line 302 connects the junction of resistance 300 and condenser 298 to the contact 304 of a switch 306 another contact 308 of which is connected to a second switch arm 310 with which cooperates a contact 312 connected by line 314 and resistance 316 to the grid of a triode 318. A condenser 320 connects the grid of triode 318 to ground and constitutes in association with resistance 316 a time delay circuit the purpose of which will be hereafter described.

The anode of triode 318 is connected through the coil 322 of a relay to a positive potential supply source. The relay armature 324 cooperates with a contact 326 which is connected through line 328 to a terminal 330 which is a common terminal of the two solenoids 63 and 64 previously described. A triode 332 having a resistance 334 connecting its cathode to ground, has its anode connected through relay coil 336 to a positive potential supply source. The armature 340 of the relay 338 containing the coil 336 alternately engages contacts 342 and 344 which are respectively connected through switches 346 and 348 to the terminals 350 and 352 which are connected to terminals of the respective solenoids 63 and 64.

The switch 289 has been already referred to as a stepping switch and may be of the type which upon each energization causes the advance of a contact over a series of cooperating points. In the present instance such a switch is arranged so that alternate points are grounded and the intermediate points are open circuited, and accordingly this switch is diagrammed as merely involving a single arm 354 and a single contact 358, it being understood that successive energizations of coil 278 result in either making or breaking the ground connection of the arm 354. Arm 354 is connected through resistance 356 to the grid of triode 332.

A condenser 360 and resistance 362 are connected in series across armature 324 and contact 326 of relay 323.

A connection 364 joins the armature 324 of relay 323 to the armature 366 of relay 368, the contact point 370 of this relay being connected to an alternating supply terminal 372 the associated terminal 374 of which is connected at 376 to the armature 340 of relay 338. The coil 378 of relay 368 is connected between a positive potential supply terminal and the anode of a triode 380. The cathode of triode 380 is connected to ground through resistance 381 and its grid is connected through resistance 382 to a negative supply terminal 384 so that the grid is normally sufficiently negative with respect to the cathode to cut off the tube. A switch 386 which is normally open is arranged to engage a contact connected to the grid to ground the grid and thus render the triode conductive.

The switch 386 is arranged in a recording meter 199 which is connected between ground and the cathode of triode 192. The switch is so arranged that when the recording meter indicates a potential value which is sufficiently low the switch 386 will be closed to render triode 380 conductive.

The various relays 368, 323 and 338 are desirably of mercury type although they have been indicated as of the lever armature type. Their actuating coils are operated from triodes the grids of which are in turn controlled by mechanical switches or relays. This arrangement is adopted for the purpose of preventing sparking since the apparatus is designed for use in a plant where inflammable hydrocarbon vapors may exist.

Neon lamps as indicated at 388 may be provided to give indications of the operation of the circuit.

Reference has already been made to the various switches which are encompassed within the dotted rectangle 390. All of the switches desirably take the form of microswitches which are controlled by cams on a cam shaft driven by a timing motor, the shaft, for example, making one revolution in six minutes. This is the time of a complete cycle of operation, the switches being shifted in timed sequence as will be presently described. It may be pointed out in particular that switch 310 is caused to close repeatedly during the cycle, for example, twenty times per minute. All of the other switches have long periods as will be presently apparent.

Before proceeding to a detailed description of the operation of the circuit there may be briefly indicated the operations which are desired.

The timing mechanism establishes two successive periods of integration of signals from the cell 16 and the phase sensing arrangement constituted by the triodes 126 and 132 following, and followed by, periods of change of the pump stroke. The first period represents, in view of delay in the system, little if any result from the preceding change of pump stroke. But the second period will reflect the result of the change of pump stroke. The long periods of integration serve to average out transient changes of impedance due to causes other than changes of pump stroke.

At the end of the second integration period the integrated signals are compared. If this comparison indicates that the cell impedance has increased, the pump stroke is changed in the same sense as the previous pump stroke change. If on the other hand the comparison indicates that the cell impedance has decreased, the pump stroke is changed in a sense opposite that of the previous change.

It will be evident that, if corrective action results, the effect of this operation will be to cause the neutralizing action of the acid to oscillate back and forth over the region of the peak of the impedance curve of Figure 4, i. e., the alkalinity will be caused to vary about the value corresponding to the maximum value of cell impedance.

Desirably, however, this hunting should be avoided so long as the alkalinity is in the desired range, or, in other words, the impedance value exceeds a predetermined minimum. For this reason, provision is made for preventing change of pump stroke when that occurs. The changes in stroke are only resumed when the range is exceeded.

Only small and equal changes in pump stroke are made in each cycle involving a change, so that excessive departures from the range of desired performance are avoided.

That the aforementioned results are secured will now be seen from the following:

Assuming for the sake of explanation that a six minute cycle is involved, the various switches and relays at what may be assumed to be zero time will have the positions indicated in Figures 5A and 5B. Under these conditions, due to the open positions of switches 152 and 160 the signals from the phase-sensitive elements of the system are cut off from the integrators. Relay coil 260 is deenergized and as a result the condensers 206 and 220 will be charged to a predetermined potential by connection to the positive terminal at 238 through the contacts 228 and 232, resistances 230 and 234 and 266 and 270 serving to regulate the rate of condenser charge. Line 302 is grounded through switch 306 and consequently the grid of thyratron 274 is at ground potential. At the same time, since triode 186 is conducting to some extent at least, the cathode of the thyratron is at a positive potential sufficiently higher than that of the control grid to insure that the thyratron does not fire. Coil 278 is consequently deenergized. Condenser 288 is charged up by the power supply 286.

Even though switch 310 is periodically being closed, the open circuit at 308 results in a negative potential from terminal 321 on the grid of triode 318 so that relay coil 322 is deenergized. The result is the opening of the power connections to the common terminal 330 of the solenoids.

Assuming that the impedance condition is not in the region desired, the switch 386 will be open with the consequence that triode 380 is cut off by the negative potential at terminal 384 and the coil of relay 368 is deenergized serving to provide contact between armature 366 and point 370.

At this time stepping switch 280 may be either in condition to ground the grid of triode 332 or, by breaking the ground connection, to provide a negative potential on the grid of triode 332 from the negative potential terminal 321. The position of armature 340 in contact with either point 342 or point 344 will depend upon the position of the stepping switch.

The first phase of the cycle of operation may last for example for one-half minute, a sufficient period to fully charge the condensers 206 and 220.

The second phase of the cycle, the first integration period, starts with the simultaneous closure of switch 254 and switch 152, switch 160 remaining open and switch 306 remaining in position illustrated in Figure 5B. The closing of switch 254 energizes relay coil 260 and causes each of the armatures 208, 204, 222 and 218 to rise to position to engage its upper contact.

The result of this is to place large condenser 206 in parallel with condenser 180 and large condenser 220 in parallel with condenser 182. Since condensers 206 and 220 were both charged in the initial phase of the cycle, and condensers 180 and 182 are of negligibly small capacities as compared with condensers 206 and 220, the result will be effective charging of both condenser arrangements to substantially the same initial extent.

Signals from the phase-sensitive circuit now charge the Miller integrator comprising the left-hand pentode 168 through the resistance at 148 and resistance 156. Integration occurs in the usual fashion with rise of potential of the control grid of the pentode and drop of its anode potential, the condenser 206 discharging. The potential of the anode is imparted to the grid of triode 186 and is reflected in a drop of potential of the cathode of this triode, with concurrent drop of potential of the cathode of the thyratron 274. This integrating phase of the cycle may last, for example, two and one-half minutes, the period of integration being sufficiently long to average out transient changes in the charging stock or due to changing operation of the plant. During this integrating period the effects of a previous pump stroke change will be felt but little, if at all.

At the end of the first integration period, switch 152 is opened and switch 160 is simultaneously closed. The input from the phase-sensitive circuit is now fed to the second integrator comprising the pentode 170, while condenser 206 associated with the first integrator holds the charge resulting thereon from the first integration. The second integration phase has the same period as the first, namely, two and one-half minutes. During the second integration the potential of the cathode of triode 192 will gradually fall but this fall of potential will not be reflected at the grid of thyratron 274 because of the grounding through connection 302 and switch 306. It may be noted that the recording meter 199 may be connected to the cathode of either of triodes 186 or 192 but if it is desired that the recording meter reflect the latest changes in operation, it is desirably connected to the triode 192.

At the end of the second integration phase of the cycle, switch 160 is opened and switch 306 is thrown away from engagement with contact 304 and into engagement with contact 308. The opening of the grounded circuit at contact 304 results in the application to the grid of the thyratron 274 of the potential appearing at the cathode of triode 192. The cathode of thyratron 274 is at this time already at the potential corresponding to that of the cathode of triode 186 resulting from the first integration phase.

If the potential of the control grid of the thyratron is less than about three volts more negative than the potential of the cathode the thyratron will fire. The firing condition will be attained at the end of the second integration phase if the cell impedance during the second integration phase is less than during the first integration phase. If the thyratron does not fire, the stepping switch 280 will not be advanced to its alternative condition. On the other hand if the thyratron does fire the stepping switch will be advanced to an alternative condition, shifting the position of the armature 340 of relay 338 to put into the circuit the other of the solenoids controlling the pump stop screw. If at the end of the second integration the potential of the cathode of triode 192 is sufficiently low to correspond to a cell impedance greater than the minimum permissible, the switch 386 will be closed causing triode 380 to become conductive by reason of the grounding of its grid and consequently causing relay 368 to be energized to open the circuit at contact 370. Under these conditions, there will be no solenoid actuation. However, assuming that this condition of sufficient impedance has not been attained, there will be contact at 370 and consequently the circuit of one or the other of the solenoids will be closed except for the operation of the relay armature 324.

Engagement of switch 306 with contact 308 serves to ground this contact and the grid of triode 318 whenever the switch 310 engages contact 312 which occurs repeatedly, at for example the rate of twenty times per minute referred to above. Accordingly, under the conditions indicated, the relay 322 is energized ten times during the last half minute of the cycle resulting in the production of ten strokes of the solenoid plunger chosen by the operation or failure of operation of the stepping switch 280. The result is advance of the stop screw or its retraction in accordance with the operations previously described. The resulting change in pump stroke has its results tested in the next cycle as described.

At the end of the cycle the cam shaft controlling the switches reestablishes the initial condition already considered so that the cycle may be repeated.

It will be evident from the above that the apparatus is capable of securing the results stated to be desirable. It will be clear that the type of control apparatus herein disclosed is of much broader applicability and is particularly advantageous when a system which is to be controlled involves large process lags. The system is particularly applicable to a process in which transient conditions should be disregarded. What is here involved is integration over successive periods which may be of any desired duration suitable for the process involved from the standpoint of transients which may be encountered and the lag between the exertion of a controlling action and the possibility of sensing its effect. The results accruing during a first period are remembered by the control system and compared with the results of a second period and this comparison is then utilized to exercise control. The characteristics just indicated would be applicable to a process in which a sensed variable was a monotonic function of a variable condition. The invention goes beyond this, however, in providing for control under conditions where a desired condition corresponds to a maximum or minimum of a sensed variable. Under these circumstances the control system has no way of determining on which side of the maximum (or minimum) operation is occurring. However, by sensing the effect of a change of control and by changing the sense of the control change if the result has taken place in the wrong direction, or by maintaining the sense of the control change if it has occurred in the correct direction, the operation may be maintained in the maximum (or minimum) region desired. Furthermore, in accordance with the invention hunting in this region, which may sometimes be unobjectionable, may be prevented by the avoidance of changes in control when a proper magnitude of the desired condition is achieved.

It may be noted that while integration of signals corresponding to a variable is required where the variable involved is subject to transient disturbances which should be disregarded in the ultimate control operation, integration may be dispensed with if transients are not present. In such case, the value of a variable at one instant in a cycle may be retained, as by the charge on a condenser, and compared with the value of the same variable at a later instant in the cycle to provide a signal (as by firing a thyratron) if the comparison shows a predetermined relationship. In other words, using an apparatus such as that described, the values of the variable at the two instants could be introduced to the cathode and control grid of the thyratron instead of the terminal potentials of the condensers 206 and 220 in the arrangement described, such terminal potentials, in fact, constituting values of a variable of the type now being discussed, if it is considered that the original variable is the value of some other variable integrated over a definite time. In such case, also, the devices rendering control inoperative, e. g. switch 386, etc., may be controlled directly by the value of the original variable.

It will be evident from the foregoing that the invention is of quite general applicability, there being the possibility of changing the constants involved, the nature of the input to be integrated, or the like, to fit desired operations.

What is claimed is:

1. Control apparatus comprising means for detecting a variable, a first integrating means operative during a first period of each of successive cycles of operation of the apparatus to receive a signal from said detecting means and provide an output signal corresponding to an integral of said signal, a second integrating means operative during a second period of each of successive cycles of operation of the apparatus to receive a signal from said detecting means and provide an output signal corresponding to an integral of the last mentioned signal, means receiving both of said output signals at the termination of said second period and providing a control signal in the event that a predetermined relationship exists between said output signals, means responsive to said control signal, and devices operated by the last mentioned means to affect said variable, the last mentioned devices affecting the variable in the same sense as in a preceding cycle if one relationship exists between said output signals, and in the opposite sense if an opposite relationship exists between said output signals.

2. Control apparatus comprising means for detecting a variable, a first integrating means operative during a first period of each of successive cycles of operation of the apparatus to receive a signal from said detecting means and provide an output signal corresponding to an integral of said signal, a second integrating means operative during a second period of each of successive cycles of operation of the apparatus to receive a signal from said detecting means and provide an output signal corresponding to an integral of the last mentioned signal, means receiving both of said output signals at the termination of said second period and providing a control signal in the event that a predetermined relationship exists between said output signals, means responsive to said control signal, devices operated by the last mentioned means to affect said variable, the last mentioned devices affecting the variable in the same sense as in a preceding cycle if one relationship exists between said output signals, and in the opposite sense if an opposite relationship exists between said output signals, and means rendering said devices inoperative if said variable has a value in a predetermined range.

3. Control apparatus comprising means for detecting a variable, a first integrating means operative during a first period of each of successive cycles of operation of the apparatus to receive a signal from said detecting means and provide an output signal corresponding to an integral of said signal, a second integrating means operative during a second period of each of successive cycles of operation of the apparatus to receive a signal from said detecting means and provide an output signal corresponding to an integral of the last mentioned signal, means receiving both of said output signals at the termination of said second period and providing a control signal in the event that a predetermined relationship exists between said output signals, means responsive to said control signal, devices operated by the last mentioned means to affect said variable, the last mentioned devices affecting the variable in the same sense as in a preceding cycle if one relationship exists between said output signals, and in the opposite sense if an opposite relationship exists between said output signals, and means rendering said devices inoperative if one of said output signals has a value in a predetermined range.

4. Control apparatus comprising means for detecting a variable, a first means providing an output signal responsive to said detecting means at a predetermined time in each of successive cycles of operation of the apparatus, means retaining said output signal, a second means providing an output signal responsive to said detecting means at a predetermined later time in each of successive cycles of operation of the apparatus, means receiving both the second output signal and the first retained output signal and providing a control signal in the event that a predetermined relationship exists between said output signals, means responsive to said control signal, and devices operated by the last mentioned means to affect said variable, the last mentioned devices affecting the variable in the same sense as in a preceding cycle if one relationship exists between said output signals, and in the opposite sense if an opposite relationship exists between said output signals.

5. Control apparatus comprising means for detecting a variable, a first means providing an output signal responsive to said detecting means at a predetermined time in each of successive cycles of operation of the apparatus, means retaining said output signal, a second means providing an output signal responsive to said detecting means at a predetermined later time in each of successive cycles of operation of the apparatus, means receiving both the second output signal and the first retained output signal and providing a control signal in the event that a predetermined relationship exists between said output signals, means responsive to said control signal, devices operated by the last mentioned means to affect said variable, the last mentioned devices affecting the variable in the same sense as in a preceding cycle if one relationship exists between said output signals, and in the opposite sense if an opposite relationship exists between said output signals, and means rendering said devices inoperative if said variable has a value in a predetermined range.

6. Control apparatus comprising means for detecting a variable, a first means providing an output signal responsive to said detecting means at a predetermined time in each of successive cycles of operation of the apparatus, means retaining said output signal, a second means providing an output signal responsive to said detecting means at a predetermined later time in each of successive cycles of operation of the apparatus, means receiving both the second output signal and the first retained output signal and providing a control signal in the event that a predetermined relationship exists between said output signals, means responsive to said control signal, devices operated by the last mentioned means to affect said variable, the last mentioned devices affecting the variable in the same sense as in a preceding cycle if one relationship exists between said output signals, and in the opposite sense if an opposite relationship exists between said output signals, and means rendering said devices inoperative if one of said output signals has a value in a predetermined range.

7. Control apparatus comprising means for detecting a variable, means providing output signals responsive to said detecting means at two predetermined times in each of successive cycles of operation of the apparatus, said responsive means holding the first output signal until the time of occurrence of the second output signal, means receiving both the second output signal and the first retained output signal and providing a control signal in the event that a predetermined relationship exists between said output signals, means responsive to said control signal, and devices operated by the last mentioned means to affect said variable, the last mentioned devices affecting the variable in the same sense as in a preceding cycle if one relationship exists between said output signals, and in the opposite sense if an opposite relationship exists between said output signals.

8. Control apparatus comprising means for detecting a variable, means providing output signals responsive to said detecting means at two predetermined times in each of successive cycles of operation of the apparatus, said responsive means holding the first output signal until the time of occurrence of the second output signal, means receiving both the second output signal and the first retained output signal and providing a control signal in the event that a predetermined relationship exists between said output signals, means responsive to said control signal, devices operated by the last mentioned means to affect said variable, the last mentioned devices affecting the variable in the same sense as in a preceding cycle if one relationship exists between said output signals, and in the opposite sense if an opposite relationship exists between said output signals, and means rendering said devices inoperative if said variable has a value in a predetermined range.

9. Control apparatus comprising means for detecting a variable, means providing output signals responsive to said detecting means at two predetermined times in each of successive cycles of operation of the apparatus, said responsive means holding the first output signal until the time of occurrence of the second output signal, means receiving both the second output signal and the first retained output signal and providing a control signal in the event that a predetermined relationship exists between said output signals, means responsive to said control signal, devices operated by the last mentioned means to affect said variable, the last mentioned devices affecting the variable in the same sense as in a preceding cycle if one relationship exists between said output signals, and in the opposite sense if an opposite relationship exists between said output signals, and means rendering said devices inoperative if one of said output signals has a value in a predetermined range.

10. Control apparatus comprising means for detecting a variable consisting of an impedance of a non-aqueous liquid, which impedance is a function of its alkalinity, a first integrating means operative during a first period of each of successive cycles of operation of the apparatus to receive a signal from said detecting means and provide an output signal corresponding to an integral of said signal, a second integrating means operative during a second period of each of successive cycles of operation of the apparatus to receive a signal from said detecting means and provide an output signal corresponding to an integral of the last mentioned signal, means receiving both of said output signals at the termination of said second period and providing a control signal in the event that a predetermined relationship exists between said output signals, means responsive to said control signal, and devices operated by the last mentioned means to affect said variable by modification of the alkalinity of said liquid, the last mentioned devices affecting the variable in the same sense as in a preceding cycle if one relationship exists between said output signals, and in the opposite sense if an opposite relationship exists between said output signals.

11. Control apparatus comprising means for detecting a variable consisting of an impedance of a non-aqueous liquid, which impedance is a function of its alkalinity, a first means providing an output signal responsive to said detecting means at a predetermined time in each of successive cycles of operation of the apparatus, means retaining said output signal, a second means providing an output signal responsive to said detecting means at a predetermined later time in each of successive cycles of operation of the apparatus, means receiving both the second output signal and the first retained output signal and providing a control signal in the event that a predetermined relationship exists between said output signals, means responsive to said control signal, and devices operated by the last mentioned means to affect said variable by modification of the alkalinity of said liquid, the last mentioned devices affecting the variable in the same sense as in a preceding cycle if one relationship exists between said output signals, and in the opposite sense if an opposite relationship exists between said output signals.

12. Control apparatus comprising means for detecting a variable consisting of an impedance of a non-aqueous liquid, which impedance is a function of its alkalinity, means providing output signals responsive to said detecting means at two predetermined times in each of successive cycles of operation of the apparatus, said responsive means holding the first output signal until the time of occurrence of the second output signal, means receiving both the second output signal and the first retained output signal and providing a control signal in the event that a predetermined relationship exists between said output signals, means responsive to said control signal, and devices operated by the last mentioned means to affect said variable by modification of the alkalinity of said liquid, the last mentioned devices affecting the variable in the same sense as in a preceding cycle if one relationship exists between said output signals, and in the opposite sense if an opposite relationship exists between said output signals.

13. Control apparatus comprising means for detecting a variable, a first integrating means operative during a first period of each of successive cycles of operation of the apparatus to receive a signal from said detecting means and provide an output signal corresponding to an integral of said signal, a second integrating means operative during a second period of each of successive cycles of operation of the apparatus to receive a signal from said detecting means and provide an output signal corresponding to an integral of the last mentioned signal, means receiving both of said output signals at the termination of said second period and providing a control signal in the event that a predetermined relationship exists between said output signals, and devices responsive to said control signal for affecting said variable.

14. Control apparatus comprising means for detecting a variable, a first means providing an output signal responsive to said detecting means at a predetermined time in each of successive cycles of operation of the apparatus, means retaining said output signal, a second means providing an output signal responsive to said detecting means at a predetermined later time in each of successive cycles of operation of the apparatus, means receiving both the second output signal and the first retained output signal and providing a control signal in the event that a predetermined relationship exists between said output signals, and devices responsive to said control signal for affecting said variable.

15. Control apparatus comprising means for detecting a variable, means providing output signals responsive to said detecting means at two predetermined times in each of successive cycles of operation of the apparatus, said responsive means holding the first output signal until the time of occurrence of the second output signal, means receiving both the second output signal and the first retained output signal and providing a control signal in the event that a predetermined relationship exists between said output signals, and devices responsive to said control signal for affecting said variable.

16. Control apparatus comprising means for detecting a variable, a first electronic integrating means operative during a first period of each of successive cycles of operation of the apparatus to receive a signal from said detecting means and provide an output signal corresponding to an integral of said signal, a second electronic integrating means operative during a second period of each of successive cycles of operation of the apparatus to receive a signal from said detecting means and provide an output signal corresponding to an integral of the last mentioned signal, electronic means receiving both of said output signals at the termination of said second period and providing a control signal in the event that a predetermined relationship exists between said output signals, means responsive to said control signal, and devices operated by the last mentioned means to affect said variable, the last mentioned devices affecting the variable in the same sense as in a preceding cycle if one relationship exists between said output signals, and in the opposite sense if an opposite relationship exists between said output signals.

17. Control apparatus comprising means for detecting a variable, a first electronic means providing an output signal responsive to said detecting means at a predetermined time in each of successive cycles of operation of the apparatus, electronic means retaining said output signal, a second electronic means providing an output signal responsive to said detecting means at a predetermined later time in each of successive cycles of operation of the apparatus, electronic means receiving both the second output signal and the first retained output signal and providing a control signal in the event that a predetermined relationship exists between said output signals, means responsive to said control signal, and devices operated by the last mentioned means to affect said variable, the last mentioned devices affecting the variable in the same sense as in a preceding cycle if one relationship exists between said output signals, and in the opposite sense if an opposite relationship exists between said output signals.

18. Control apparatus comprising means for detecting a variable, electronic means providing output signals responsive to said detecting means at two predetermined times in each of successive cycles of operation of the apparatus, said responsive means holding the first output signal until the time of occurrence of the second output signal, electronic means receiving both the second output signal and the first retained output signal and providing a control signal in the event that a predetermined relationship exists between said output signals, means responsive to said control signal, and devices operated by the last mentioned means to affect said variable, the last mentioned devices affecting the variable in the same sense as in a preceding cycle if one relationship exists between said output signals, and in the opposite sense if an opposite relationship exists between said output signals.

References Cited in the file of this patent

UNITED STATES PATENTS

| | | |
|---|---|---|
| 2,300,537 | Davis | Nov. 3, 1942 |
| 2,530,326 | Davis | Nov. 14, 1950 |
| 2,593,562 | Hornfeck | Apr. 22, 1952 |
| 2,603,689 | Stevens | July 15, 1952 |
| 2,604,267 | Smith | July 22, 1952 |
| 2,607,718 | Suthard | Aug. 19, 1952 |
| 2,659,850 | Phillips | Nov. 17, 1953 |